United States Patent
Den Boer

(12) 
(10) Patent No.: US 6,298,136 B1
(45) Date of Patent: *Oct. 2, 2001

(54) CRYPTOGRAPHIC METHOD AND APPARATUS FOR NON-LINEARLY MERGING A DATA BLOCK AND A KEY

(75) Inventor: Huibert Den Boer, Bonn-Beuel (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,591

(22) Filed: May 20, 1997

(30) Foreign Application Priority Data

May 20, 1996 (NL) .................................... 1003159

(51) Int. Cl.$^7$ ........................................ H04L 9/28
(52) U.S. Cl. .............................. 380/29; 380/28
(58) Field of Search .................. 380/29, 28, 37

(56) References Cited

U.S. PATENT DOCUMENTS 5,398,284 * 3/1995 Koopman ................. 380/28
5,488,661 * 1/1996 Mitsuru ..................... 380/29

OTHER PUBLICATIONS

David Cheng, Analysis, Analysis of Linear System, Addison–Wesley, p. 7, 1959*

Thomas Kailath, Prentice–Hall, 1980, p. 3, 1980.*

A Fast VLSI Multiplier for GF(2"'), by P. Andrew Scott, IEEE Journal, vol. SAC–4, No. 1, Jan. 1986, pp. 62–66.

Menezes et al., "Handbook of Applied Cryptography", pp. 75–77 & 80–81.

* cited by examiner

Primary Examiner—Gail Hayes
Assistant Examiner—James Seal
(74) Attorney, Agent, or Firm—Gregory L. Thorne

(57) ABSTRACT

A method and apparatus for cryptographically converting a digital input data block into a digital output data block. The apparatus has an input for supplying the input data block and a further input for supplying a code conversion digital key K1. Cryptographic processing merges a selected part M1 of the digital input data block with the key K1 to produce a data block B1 which is non-linearly dependent on M1 and K1. The merging is performed in one sequentially inseparable step. The digital output block is derived from a selected part of the data block B1.

10 Claims, 6 Drawing Sheets

CRYPTOGRAPHIC METHOD AND APPARATUS FOR NON-LINEARLY MERGING A DATA BLOCK AND A KEY

BACKGROUND OF THE INVENTION

CROSS REFERENCE TO RELATED APPLICATIONS

1. Field of the Invention

The invention relates to a method for converting a digital input block into a digital output block; said conversion comprising the step of merging a selected part M1 of the digital input block with a first key K1 and producing a data block B1 which non-linearly depends on the selected part M1 and the first key K1, and where a selected part of the digital output block is derived from the data block B1.

The invention further relates to an apparatus for cryptographically converting a digital input block into a digital output block; the apparatus comprising first input means for supplying the digital input block; second input means for supplying a first key K1; cryptographic processing means for converting the digital input block into the digital output block; such conversion comprising merging a selected part M1 of the digital input block with the first key K1 and producing a data block B1 which non-linearly depends on the selected part M1 and the first key K1, and where a selected part of the digital output block is derived from the data block B1; and output means for outputting the digital output block.

2. Description of the Related Art

The Data Encryption Standard (DES) of the National Bureau of Standard [FIPS publication 46, Jan. 15, 1977] describes a widely used algorithm for converting a digital input block into a digital output block. Such an algorithm is generally referred to as a block cipher. The DES algorithm is used for encrypting (enciphering) and decrypting (deciphering) binary coded information. Encrypting converts intelligible data, referred to as plaintext, into an unintelligible form, referred to as ciphertext. Decrypting the ciphertext converts the data back to its original form. In the so-called electronic code book mode, DES is used to encrypt blocks of 64 bits of plaintext into corresponding blocks of 64 bits of ciphertext. In this mode, the encryption uses keys which are derived from a 64 bit key, of which 56 bits may be freely selected. FIG. 1 shows the overall structure of DES during encrypting. In the encrypting computation, the input (64 bit plaintext) is first permuted using a 64 bit fixed permutation IP. The result is split into 32 left bits $L_0$ and 32 right bits $R_0$. The right bits are transformed using a cipher function $f(R_0, K_1)$, where $K_1$ is a sub-key. The result $f(R_0, K_1)$ is added (bit-wise modulo 2) to the left bits, followed by interchanging the two resulting 32 bit blocks $L_0 \oplus f(R_0, K_1)$ and $R_0$. This procedure is continued iteratively for a total of 16 rounds. At the end of the last round the inverse permutation of the initial permutation IP is applied.

In the calculation of $f(R_i, K_{i+1})$ the 32 right bits $R_i$ are first expanded to 48 bits in the box E, as illustrated in FIG. 2. According to a given table this expansion is performed by taking some input bits twice as an output bit and others only once. Then, the expanded 48 bits are added (bit-wise modulo 2) to the 48 key bits $K_i$. The resulting 48 bits are split into 8 groups of 6 bits each. Each of these groups is processed by an S box ($S_i$), which reduces the 6 bits to 4 bits in a non-linear operation. The eight $S_i$ boxes are given in the form of a table. The total output is 32 bits, which is permuted in the box P. P is also given in the form of a table.

FIG. 3 illustrates the key schedule calculation. The key consists of 64 bits, of which only 56 are used in the algorithm. Those 56 bits should be chosen randomly. Eight complementing error detecting bits are used to make the parity of each byte of the key odd. The selection of the 56 bits is performed in box PC1, together with a permutation. The result is split into two 28 bit words $C_0$ and $D_0$. To obtain the 48 key bits for each round, first the words $C_0$ and $D_0$ are left shifted once or twice. A selection and a permutation PC2 are then applied to the result. The output of PC2 is the 48 bit sub-key $K_i$ which is used in $f(R_0, K_i)$. The process of shifting, selecting and permutating is repeated to generate a sub-key for each round. A table specifies how many shifts must be performed to obtain the next 48 bits of the sub-key for the following round.

The same algorithm and key can be used for decrypting a ciphertext. The initial permutation for the decrypting cancels the inverse permutation of the encrypting. Each round consists of a, so-called, Feistel cipher. It is well-known that for Feistel-ciphers the inverse operation consists of using the same rounds as used for encrypting but applying the sub-keys in inverse order. As such, the first decrypting round must be supplied with the same sub-key as used for the sixteenth encrypting round, the second decrypting round must be supplied with the same sub-key as used for the fifteenth encrypting round, etc. It is also well-known how the DES algorithm can be used in other encryption modes, such as the cipher feedback mode. In this mode, the DES algorithm is used to generate a stream of statistically random binary bits, which are combined with the plaintext, using, for instance, an exclusive-or logic operation.

The DES algorithm, in essence, comprises an initial permutation, followed by sixteen key-dependent computations on part of the data and terminated with an inverse permutation. Each key dependent computation comprises adding (module 2) key-dependent bits to the data part, followed by a non-linear operation on sub-blocks of the data part, and terminated by a permutation (linear operation) of the data part.

In general, DES is considered to be a good encryption/decryption tool. It is, however, an open question whether or not DES has remained secure over the past years, particularly in view of the recent very powerful differential cryptanalytic attacks.

SUMMARY OF THE INVENTION

It is an object of the invention to provide a cryptographic method and apparatus of the kind set forth which is more robust against cryptanalytic attacks.

To achieve this object, the cryptographic method according to the invention is characterised in that the step of emeriging the data and the key is performed by executing a non-linear function g for non-linearly merging said selected part M1 of the data and said first key K1 in one, sequentially inseparable step. In the DES system, as shown in FIG. 2, in a first processing step the R data is bit-wise added to the key, followed by a second processing step of non-linearly processing the result (S-boxes). According to the invention, an algorithm is used which non-linearly merges data with a key in one step (i.e. one, sequentially inseparable step). As such, adding the key bits to the data is an integrated part of the non-linear operation, making the system more immune against modern attacks, such as differential cryptanalysis.

In an embodiment of the method according to the invention, in each round both parts of the digital input block are processed, giving a better encryption result than for conventional Feistel ciphers, such as DES, where during each round only half of the digital input block is being processed. To ensure that the same system can be used for both encryption and decryption, one part of the data is processed using an operation g, whereas the other half is processed using the inverse operation $g^{-1}$. Using this scheme, decrypting is performed by using the same system but supplying the keys in reverse order to the rounds (during decryption the first non-linear step is supplied with the key which, during encryption, was supplied to the last non-linear step, etc ). Compared to a conventional implementation of a Feistel cipher with twice as many rounds, the system according to the invention is faster.

The measure of splitting a relatively large data block and key, of for instance 64 bits, into smaller sub-blocks and sub-keys simplifies real-time non-linear processing.

In an embodiment of the method according to the invention, a constant is used to enhance the quality of the encryption. Advantageously, the constant is predetermined per system, forming, for instance, a customer-specific constant. Alternatively, the constant is generated using a pseudo-random generator.

The invention provides a way for non-linearly merging the data sub-block and the sub-key in one step. Additionally, different inputs all result in different outputs. This increases the immunity of the system against cryptanalytic attacks, compared to DES where the non-linear operation reduces the 6-bit input sub-block to a 4-bit output sub-block, implying that the same output is produced for four different inputs.

In an embodiment of the method according to the invention a constant is used to enhance the quality of the encryption. Advantageously, the constant is predetermined per system, forming, for instance, a customer-specific constant. Alternatively, the constant is generated using a pseudo-random generator.

In an embodiment of the method according to the invention individual sub-blocks corresponding to different parts of the digital input block are swapped to improve the quality of the encryption.

Preferably, the sub-block $m_i$ comprises eight data bits. This further improves the quality of the non-linear operation compared to DES, where the non-linear operation converts six to four bits.

Another embodiment has the advantage of reducing the multiplication in $GF(2^8)$ to operations in $GF(2^4)$, making it possible to achieve a simpler or more cost-effective implementation.

The multiplication in $GF(2^8)$ may be reduced to operations in $GF(2^4)$.

An embodiment of the method according to the invention is characterised in that β is a root of an irreducible polynomial $h(x)=x^4+x^3+x^2+x+1$ over $GF(2)$. This is a preferred choice for β, allowing the use of the so-called shifted polynomial base.

An embodiment of the method according to the invention is characterised in that calculating the inverse of an element of $GF(2^8)$ comprises performing a series of calculations in $GF(2^4)$. By reducing the inverse operation in $GF(2^8)$ to operations in $GF(2^4)$ a simpler or more-cost effective implementation can be achieved.

An embodiment of the method according to the invention is characterised in that calculating the inverse of said element b comprises calculating $(a_0^2+a_0a_1+a_1^2\beta)^{-1}((a_0+a_1)+a_1D)$. This is an effective way of reducing the inverse operation in $GF(2^8)$ to operations in $GF(2^4)$.

An embodiment of the method according to the invention is characterised in that said first key K1 comprises 64 data bits and wherein each of said sub-keys $k_i$ comprises eight data bits. By using a large key the quality of the encryption is increased.

To achieve the object of the invention, the apparatus according to the invention is characterised in that said cryptographic processing means is arranged to perform said merging by executing a non-linear function g for non-linearly merging said selected part M1 and said first key K1 in one, sequentially inseparable step.

These and other aspects of the invention will be apparent from and elucidated with reference to the embodiments shown in the drawings.

DESCRIPTION OF THE PREFERRED EMBODIMENTS

Figure 4:
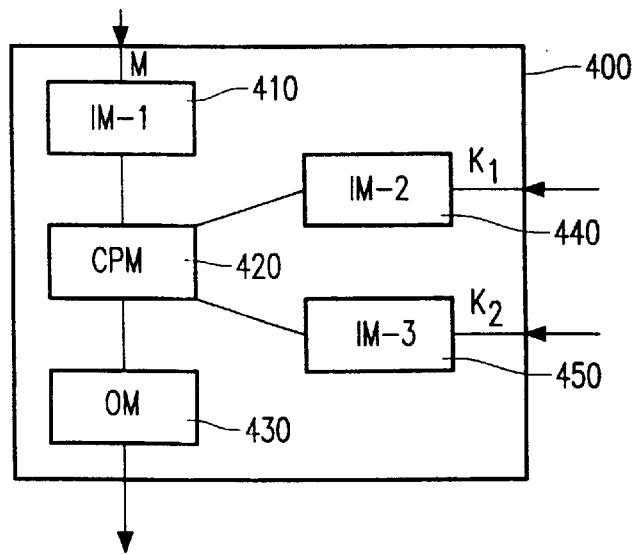
FIG. 4 shows a block diagram of the cryptographic apparatus of the invention.
Figure 3:
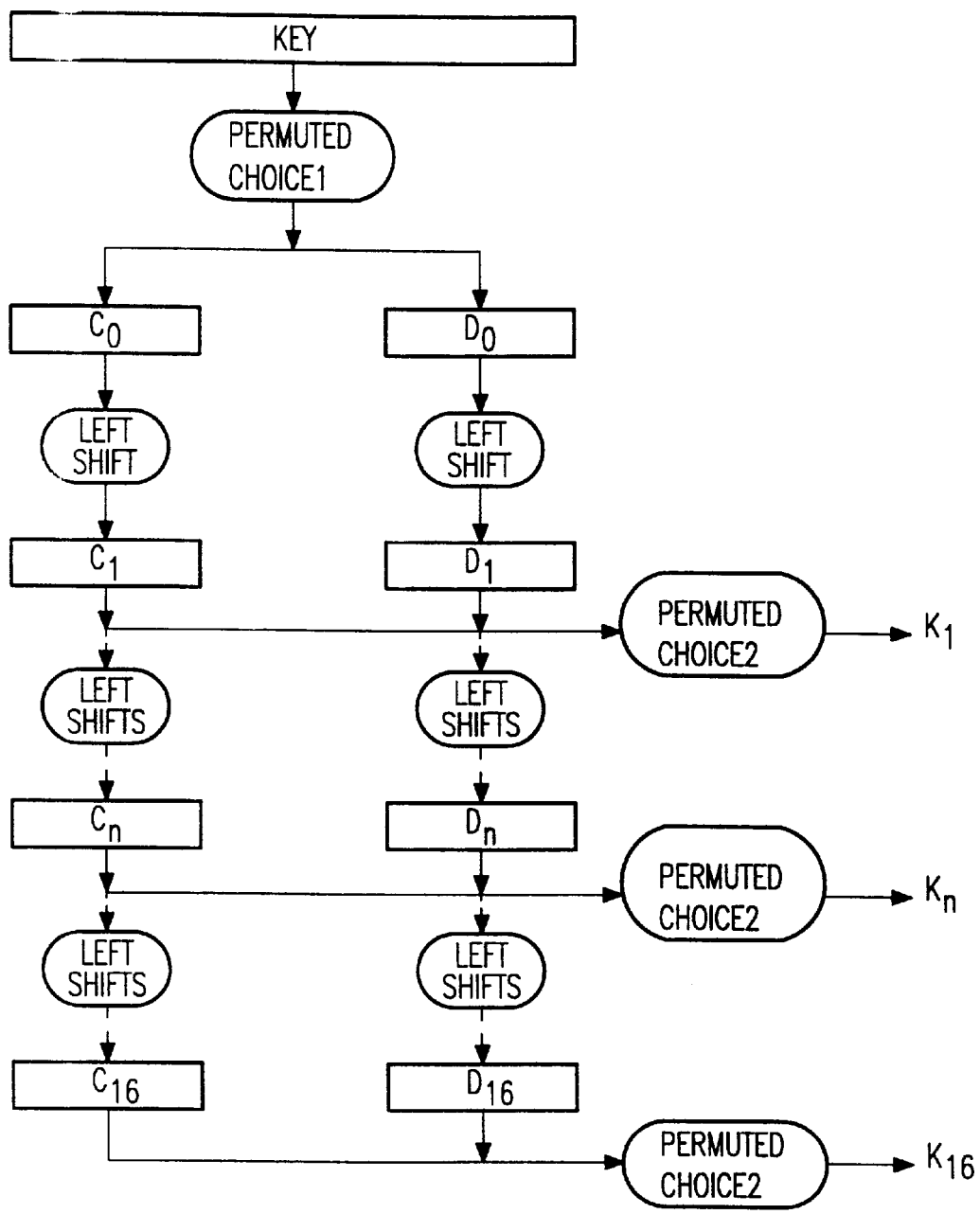
FIG. 3 illustrates details of the key calculation in DES.

FIG. 4 shows a block diagram of the cryptographic apparatus 400 according to the invention. For the purpose of explaining the invention, the system is described in the electronic code book mode. Persons skilled in the art will be able to use the system in other modes as well. The apparatus 400 comprises first input means 410 for providing a digital input block M. The digital input block M may be any suitable size. Preferably, M is sufficiently large, for instance 128 bits, to obtain a reasonably secure encryption result. The apparatus 400 further comprises cryptographic processing means 420 for converting the digital input block into a digital output block. Advantageously, the digital output block has substantially equal length as the digital input block. The apparatus 400 comprises output means 430 for outputting the digital output block. Basically, the cryptographic processing means 420 converts the digital input block M into the digital output block by merging a selected part M1 of the digital input block M with a first key K1, producing a data block B1 which non-linearly depends on M1 and K1. The merging is performed in one, sequentially inseparable step. The digital output block is derived from B1 and the remaining part of M, which is not part of M1. To obtain the first key K1, the cryptographic apparatus 400 comprises second input block 440. As will be described in more details below, a second part M2 of the digital input block may be non-linearly merged with a second key K2, preferably, using an operation inverse to the operation for merging M1 and K1, producing a data block B2. In this case, the digital output block also depends on B2. To obtain the second key K2, the cryptographic apparatus 400 comprises third input block 450.

It will be appreciated that the cryptographic apparatus 400 may be implemented using a conventional computer, such as a PC, or using a dedicated encryption/decryption device. The digital input block may be obtained in various ways, such as via a communication network, from a data storage medium, such as a harddisk or floppy disk, or directly being entered by a user. Similarly, the digital output block may be output in various ways, such as via a communication network, stored on a data storage medium, or displayed to a user. Preferably, secure means are used to this end. The cryptographic processing means 420 may be a conventional processor, such as for instance used in personal computers, but may also be a dedicated cryptographic processor. The cryptographic apparatus 400 may, in part or in whole, be implemented on a smart-card.

Figure 1:
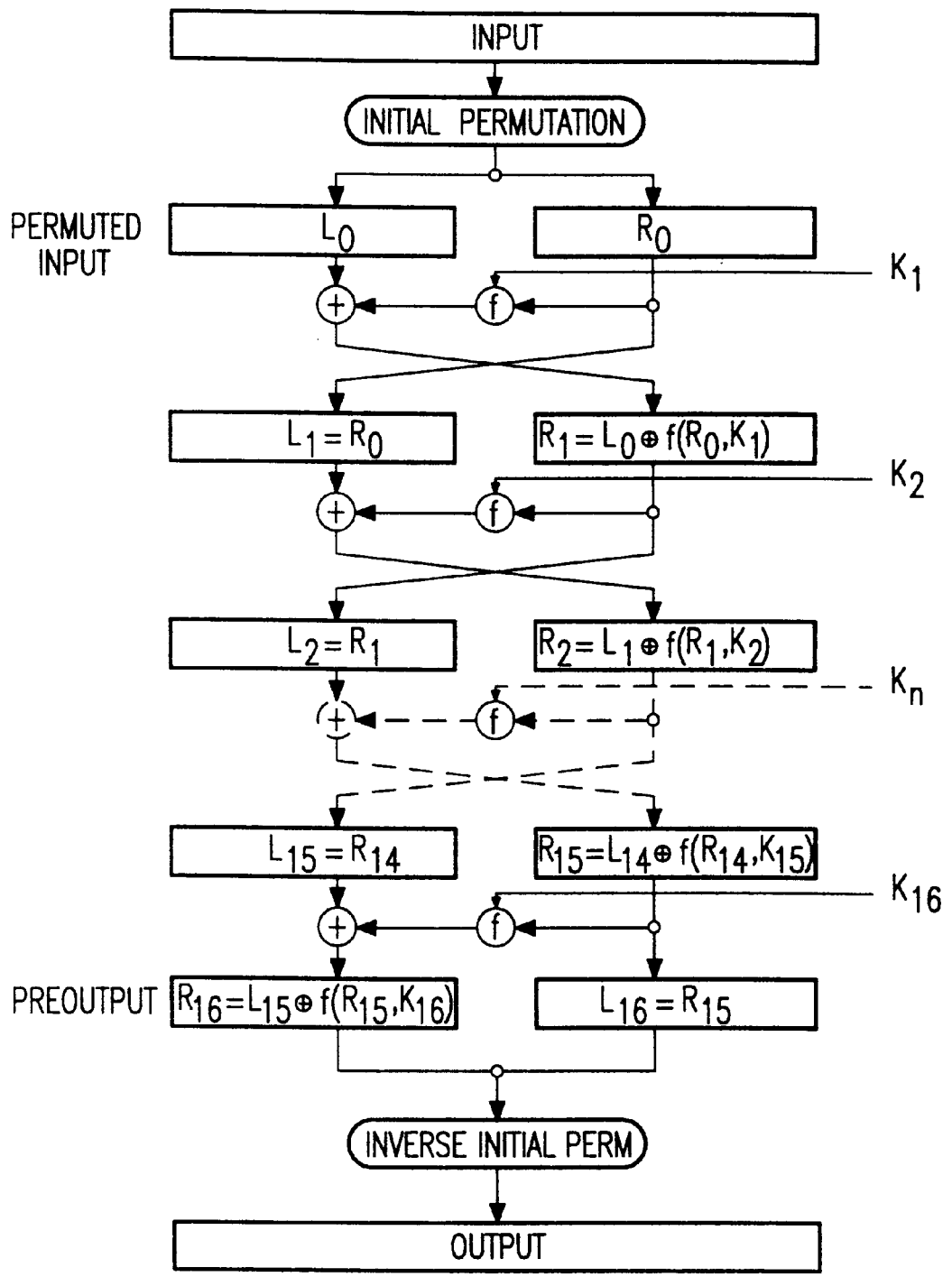
FIG. 1 shows the processing steps for the DES system.
Figure 2:
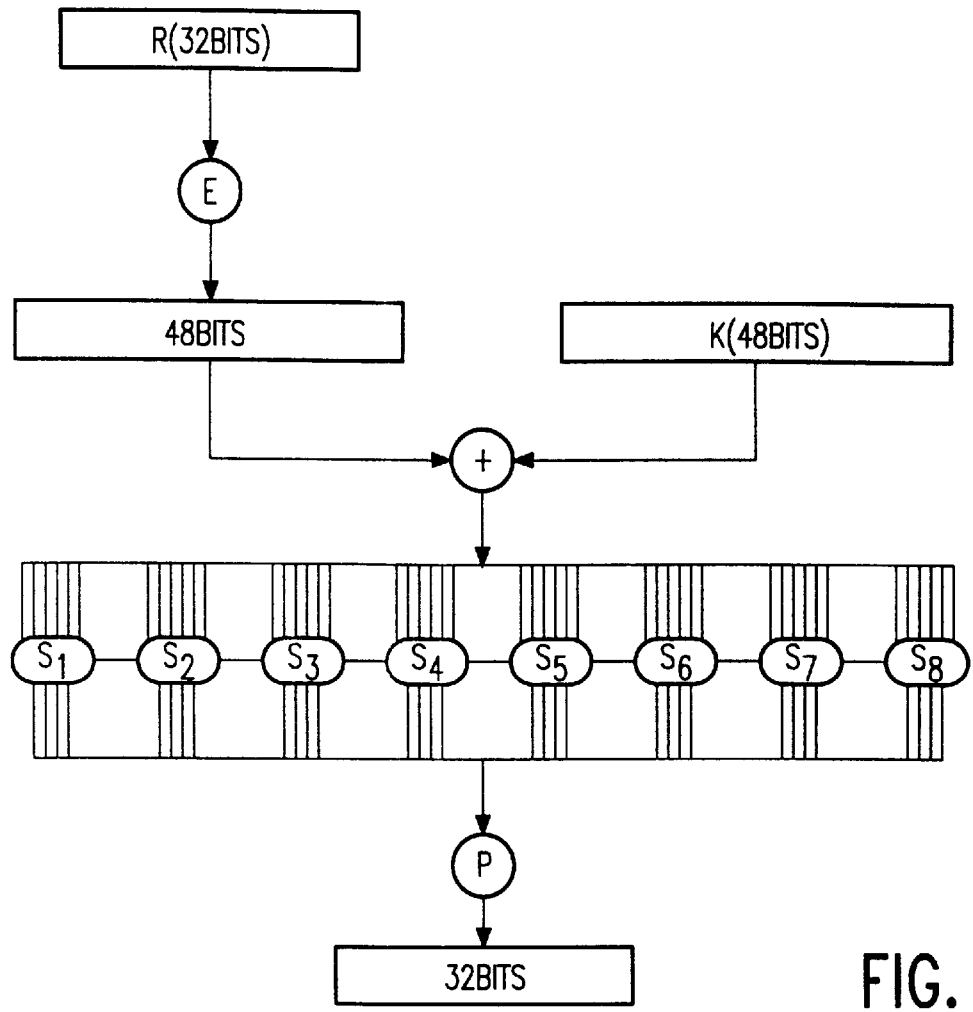
FIG. 2 illustrates details of merging the data with the key and the non-linear operation in DES.

Details of the cryptographic conversion process will be described for encrypting blocks of 128 bits of plaintext into corresponding blocks of 128 bits of ciphertext. Persons skilled in the art will be able to use the system for other block sizes as well. Data sizes shown in the Figures are given for reasons of clarity and should be treated as examples only. The description focuses on the non-linear processing of the data and the merging of the key with the data as performed in one round. As such the invention can be applied in a system as shown in FIG. 1, comprising multiple rounds and also including a linear operation on the data block in each round.

Figure 5:
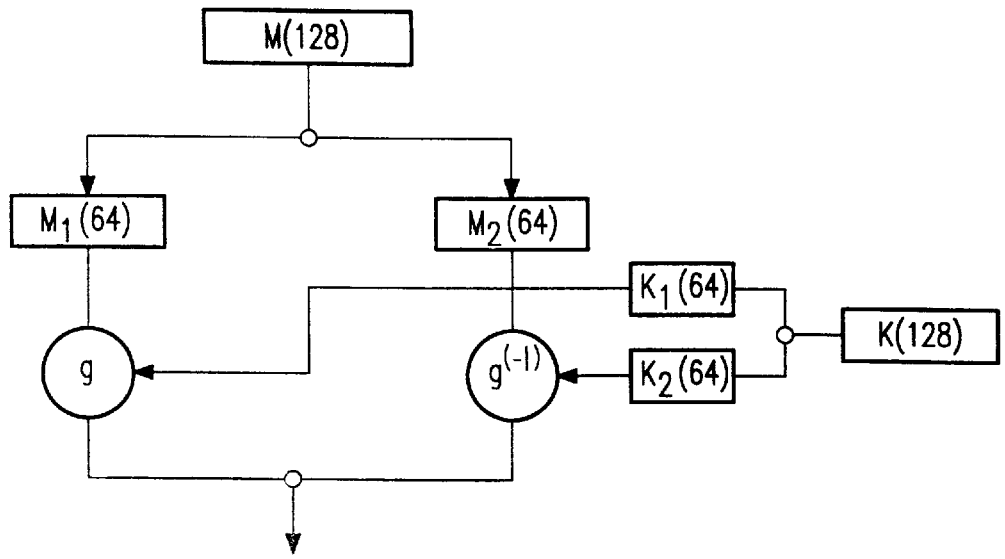
FIG. 5 illustrates separate processing of two parts of the digital input block.
Figure 6:
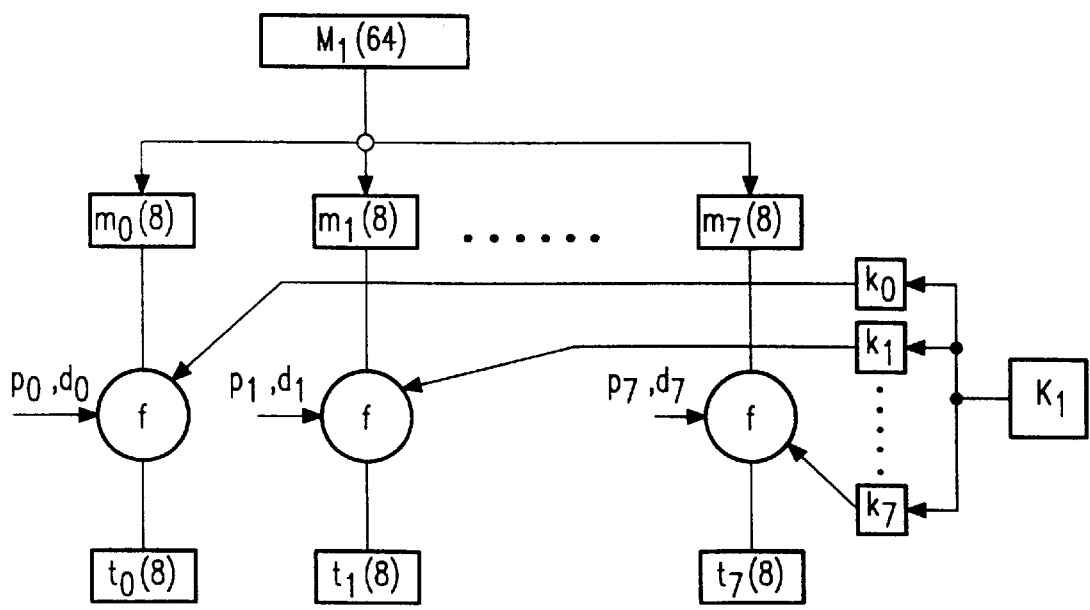
FIG. 6 illustrates processing of a part of the digital input block in the form of sub-blocks.
Figure 7:
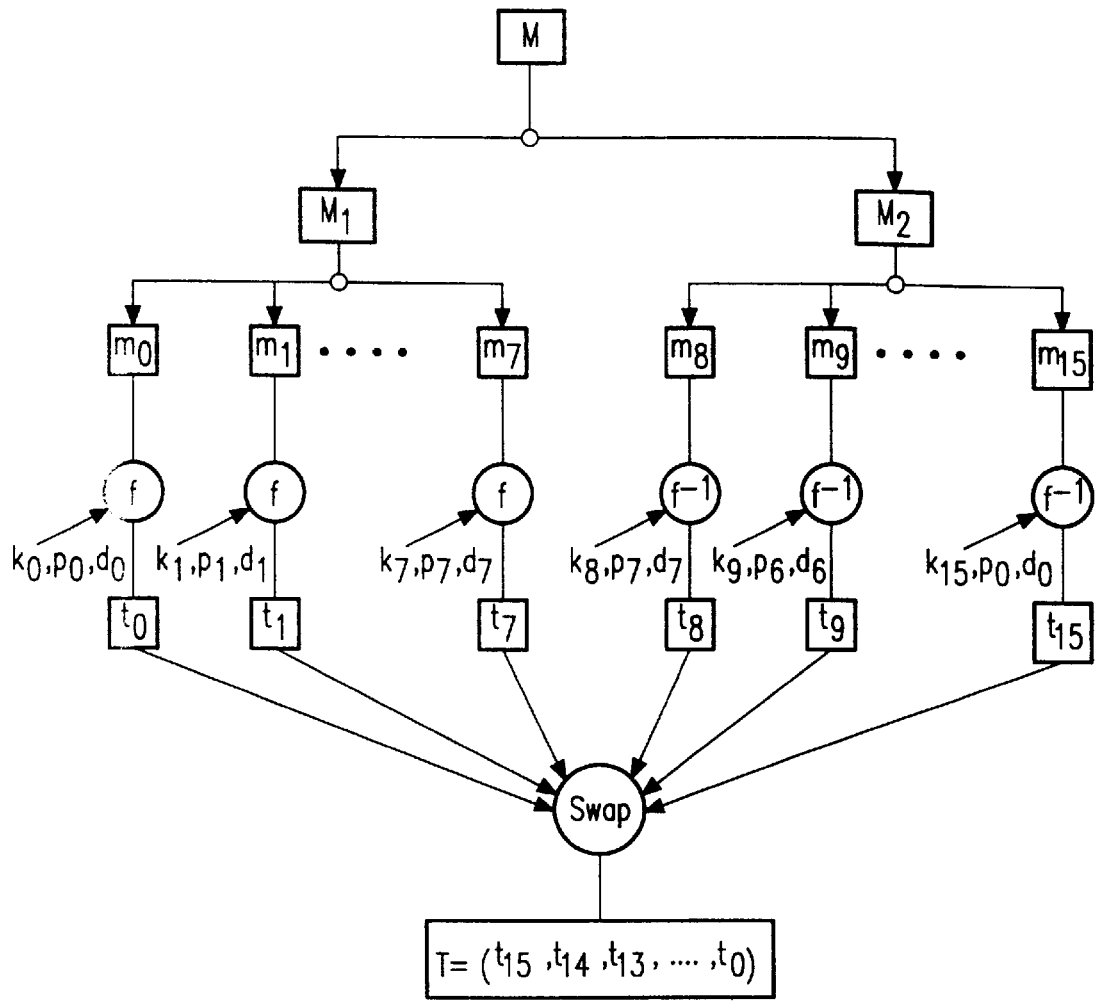
FIG. 7 illustrates processing of two parts in the form of sub-blocks.

As shown in FIG. 5, the message block M of 128 bits is divided into a first part M1 and a second part M2 (a left and a right block). Preferably, both parts are of equal size, 64 bits. It will be appreciated that M1 and M2 may also be derived from M using a more complicated selection process. M1 is processed using a non-linear function g. In principle, it is not required to process M2 during the same round. Advantageously, M2 is processed in the same round using the inverse function $g^{-1}$. Each of the functions g and $g^{-1}$ non-linearly merges, M1 or, respectively, M2 with a key K1 or, respectively K2. Preferably, the data parts and the keys have the same size. Since it is difficult to implement a good non-linear operation on a large data block and non-linearly processing a large data block is time consuming, the data parts M1 and M2 are split into sub-blocks. FIG. 6 illustrates this for M1. FIG. 7 illustrates the splitting of M1 and M2. Using 64-bit data parts M1 and M2, advantageously, the parts are each split into eight 8-bit elements, where M1=($m_0$, $m_1$, ..., $m_7$) and M2=($m_8$, $m_9$, ..., $m_{15}$). The two keys K1 and K2 may be derived from a larger key, for instance, by splitting a 128 bit key into two 64-bit keys K1 and K2. The two keys K1 and K2 may be split further. Using 64-bit keys, advantageously, each key is split into 8-bit sub-keys, giving a total of sixteen 8-bit sub-keys $k_j$, j=0 ... 15. Each of the sub-keys $k_j$ is associated with the corresponding sub-block $m_j$. Each sub-block is processed separately. Preferably, the sub-blocks are processed in parallel. If preferred, the sub-blocks relating to one round may also be serially processed. The first group of sub-blocks, forming M1, are each processed by a cipher function f. The second group of sub-blocks are each processed by the inverse function $f^{-1}$.

For the cryptographic operations, an n-bit sub-block or sub-key is considered to represent an element of $GF(2^n)$ (Galois Field). All operations are, therefore, in $GF(2^n)$.

In its basic form, the cipher function f has two inputs $m_j$ and $k_j$ and one output $t_j$ as also illustrated in FIGS. 6 and 7, where $t_j=f(m_j, k_j)$, for j=0 to 7. In the basic form, the cipher function f involves one operation $h(b_j, k_j)$ with an output of substantially equal size as $b_j$. The function h has a data sub-block $b_j$ and a sub-key $k_j$ as input, where $b_j=m_j$ for the basic form of the cipher function f. The function f (in this embodiment the same as the function h) is defined as follows for j=0 ... 7:

$$h(b_j, k_j) = \begin{array}{ll} (b_j \cdot k_j)^{-1}, & \text{if } b_j \neq 0, k_j \neq 0, b_j \neq k_j \\ (k_j)^{-2}, & \text{if } b_j = 0 \\ (b_j)^{-2}, & \text{if } k_j = 0 \\ 0, & \text{if } b_j = k_j \end{array} \quad 1.$$

Similarly, in its basic form the inverse cipher function $f^{-1}$ has two inputs $m_j$ and $k_j$ and one output $t_j$ as also illustrated in FIGS. 6 and 7, where $t_j=f^{-1}(m_j, k_j)$, for j=8 to 15. The inverse cipher function $f^{-1}$ involves also one operation, $h^{-1}(b_j, k_j)$ with an output of substantially equal size as $b_j$. The function $h^{-1}$ is the inverse of h. As before, $b_j=m_j$ in the basic form of the cipher function $f^{-1}$. The function $f^{-1}$ (in this embodiment the same as the functions $h^{-1}$) is defined as follows for j=8 ... 15:

$$h^{-1}(b_j, k_j) = \begin{array}{ll} (b_j \cdot k_j)^{-1}, & \text{if } b_j \neq 0, k_j \neq 0, \text{ and } b_j \cdot k_j^2 \neq 1 \\ k_j, & \text{if } b_j = 0 \\ (b_j)^{-1/2}, & \text{if } k_j = 0 \\ 0, & \text{if } b_j \cdot k_j^2 = 1 \end{array} \quad 1.$$

In a further embodiment, the outputs $t_j$ of the cipher functions f ($t_j=f(m_j, k_j)$, for j=0 to 7) and the outputs of the inverse cipher function $f^{-1}$ ($t_j=f^{-1}(m_j, k_j)$, for j=8 to 15) are swapped in the following manner: $t_j <-> t_{15-j}$ for j=0 to 7. This is illustrated in FIG. 7.

In a further embodiment, a constant is added (bit-wise module 2) to each data sub-block $m_j$ before executing the function h. Preferably, eight independent constants $p_j$ (j=0 ... 7) are used, each being added to the corresponding data sub-block $m_j$. The same function h is used as before, now operating on $b_j=m_j \oplus p_j$. The cipher function f is now defined as follows:

1. $b_j=m_j \oplus p_j$ $$h(b_j, k_j) = \begin{array}{ll} (b_j \cdot k_j)^{-1}, & \text{if } b_j \neq 0, k_j \neq 0, b_j \neq k_j \\ (k_j)^{-2}, & \text{if } b_j = 0 \\ (b_j)^{-2}, & \text{if } k_j = 0 \\ 0, & \text{if } b_j = k_j \end{array} \quad 2.$$

Similarly, for the inverse cipher function $f^{-1}$ also a constant is added (bit-wise module 2) to each data sub-block $m_j$. To allow the inverse function $f^{-1}$ to be used to decrypt text encrypted using the cipher function f, the constant is added after the function h. Preferably, the same eight independent constants $p_j$ (j=0 ... 7) are used as used for the cipher function f. Now, the constants $p_j$ are being added to the 15-j-th stream (j=0 ... 7). As a consequence, the inverse cipher function $f^{-1}$ involves the following two operations (j=8 ... 15):

$$h^{-1}(b_j \cdot k_j) = \begin{cases} (b_j \cdot k_j)^{-1}, & \text{if } b_j \neq 0, k_j \neq 0, \text{ and } b_j \cdot k_j^2 \neq 1 \\ k_j, & \text{if } b_j = 0 \\ (b_j)^{-1/2}, & \text{if } k_j = 0 \\ 0, & \text{if } b_j \cdot k_j^2 = 1 \end{cases} \quad 1.$$

2. $t_j = h^{-1}(b_j \cdot k_j) \oplus p_{15-j}$

Finally, $t_j$ and $t_{15-j}$ are swapped (j=0 . . . 7).

In a further embodiment, a further constant is added (bit-wise module 2) to each data sub-block $m_j$ after executing the function h. Preferably, eight independent constants $d_j$ (j=0 . . . 7) are used, each being added to the corresponding data sub-block $m_j$. The same function h is used as before. The cipher function f is now defined as follows:

1. $b_j = m_j \oplus p_j$ $$h(b_j, k_j) = \begin{cases} (b_j \cdot k_j)^{-1}, & \text{if } b_j \neq 0, k_j \neq 0, b_j \neq k_j \\ (k_j)^{-2}, & \text{if } b_j = 0 \\ (b_j)^{-2}, & \text{if } k_j = 0 \\ 0, & \text{if } b_j = k_j \end{cases} \quad 2.$$

3. $t_j = h(b_j, k_j) \oplus d_j$

Similarly, for the inverse cipher function $f^{-1}$ also a constant is added (bit-wise module 2) to each data sub-block $m_j$. To allow the inverse function $f^{-1}$ to be used to decrypt text encrypted using the cipher function f, the constant is added before executing the function h. Preferably, the same eight independent constants $d_j$ (j=0 . . . 7) are used as for the cipher function f. Now, the constants $d_j$ are being added to the 15-j-th stream (j=0 . . . 7). The same function $h^{-1}$ is used as before, now operating on $b_j = m_j \oplus d_{15-j}$. As a consequence, the inverse cipher function $f^{-1}$ involves the following three operations (j=8 . . . 15):

1. $b_j = m_j \oplus d_{15-j}$.

$$h^{-1}(b_j \cdot k_j) = \begin{cases} (b_j \cdot k_j)^{-1}, & \text{if } b_j \neq 0, k_j \neq 0, \text{ and } b_j \cdot k_j^2 \neq 1 \\ k_j, & \text{if } b_j = 0 \\ (b_j)^{-1/2}, & \text{if } k_j = 0 \\ 0, & \text{if } b_j \cdot k_j^2 = 1 \end{cases} \quad 2.$$

3. $t_j = h^{-1}(b_j \cdot k_j) \oplus p_{15-j}$

Finally, $t_j$ and $t_{15-j}$ are swapped (j=0 . . . 7). It will be appreciated that it is also possible to use the constants $d_j$ without using constants $p_j$.

In a further embodiment, the cipher function f raises the outcome of the function h to a power of two. The same function h is used as before. The cipher function f is now defined as follows:

1. $b_j = m_j \oplus p_j$ $$h(b_j, k_j) = \begin{cases} (b_j \cdot k_j)^{-1}, & \text{if } b_j \neq 0, k_j \neq 0, b_j \neq k_j \\ (k_j)^{-2}, & \text{if } b_j = 0 \\ (b_j)^{-2}, & \text{if } k_j = 0 \\ 0, & \text{if } b_j = k_j \end{cases} \quad 2.$$

3. $s_j = h(b_j, k_j)^{2 \uparrow i}$
4. $t_j = s_j \oplus d_j$

Similarly, the inverse cipher function $f^{-1}$ also raises a data sub-block to a power of 2. To allow the inverse function $f^{-1}$ to be used to decrypt text encrypted using the cipher function f, the additional operation is performed before executing the function h. The same function $h^{-1}$ is used as before, now operating on $b_j = m_j \oplus d_{15-j}$. As a consequence, the inverse cipher function $f^{-1}$ involves the following four operations (j=8 . . . 15):

1. $q_j = m_j \oplus d_{15-j}$
2. $b_j = q_j^2 \uparrow (j-7)$ $$h^{-1}(b_j \cdot k_j) = \begin{cases} (b_j \cdot k_j)^{-1}, & \text{if } b_j \neq 0, k_j \neq 0, \text{ and } b_j \cdot k_j^2 \neq 1 \\ k_j, & \text{if } b_j = 0 \\ (b_j)^{-1/2}, & \text{if } k_j = 0 \\ 0, & \text{if } b_j \cdot k_j^2 = 1 \end{cases} \quad 2.$$

3. $t_j = h^{-1}(b_j \cdot k_j) \oplus p_{15-j}$

Finally, $t_j$ and $t_{15-j}$ are swapped (j=0 . . . 7). It will be appreciated that it is also possible to use the operation of raising to a power of 2 without using one or both of the constants $d_j$ and $p_j$.

For decrypting the same algorithm is used as for encrypting, but the sub-keys are swapped: instead of $k_j$, $k_{15-j}$ is used, j=0 . . . 15.

The multiplication in $GF(2^8)$

In principle, for the invention any multiplication in $GF(2^8)$ may be used. An example of a VLSI implementation of multiplications in $GF(2^m)$ is given in [P. A. Scott, "A fast VLSI multiplier for $GF(2^m)$", IEEE Journal on selected areas in communications, Vol. SAC-4, No. 1, January 1986, pages 62–66]. Advantageously, the following mechanism is used to reduce the multiplication in $GF(2^8)$ to a series of multiplications and additions in $GF(2^4)$. As is known in the art, in finite fields with a characteristic of 2 (e.g. $GF(2^n)$) and the Galois field represented in binary arithmetic, the subtraction operation (i.e. the inverse of addition) is the same as the addition operation. For convenience, the "+" symbol is used herein for this addition/subtraction operation, although a "−" symbol may be equivalently substituted for ease of understanding, as required.

Let in $GF(2^4)$, $\beta$ be the non-trivial root of $\beta^5 = 1$ (non-trivial means $\beta \neq 1$, or, equally, $\beta$ is the root of the irreducible polynomial $h(x) = x^4 + x^3 + x^2 + x + 1$ over $GF(2)$, since: $x^5 - 1 = (x-1)(x^4 + x^3 + x^2 + x + 1)$). The normal base $\beta$, $\beta^2$, $\beta^4$, $\beta^8$ is taken as the base in $GF(2^4)$. Since according to the polynomial $\beta^8 = \beta^3$, this is the same as the so-called shifted polynomial base: $\beta$, $\beta^2$, $\beta^3$, $\beta^4$.

Let D be an element of $GF(2^8)$, defined as a root of the irreducible polynomial $k(x) = x^2 + x + \beta$ over $GF(2^4)$. Every element of $GF(2^8)$ can be represented as $a_0 + a_1.D$, with $a_0$ and $a_1$ being elements of $GF(2^4)$. In binary terminology, the number b of $GF(2^8)$ can be represented using eight bits, arranged as a vector $(a_0, a_1)$, with $a_0$, $a_1$ having four bits, representing numbers of $GF(2^4)$. As such, the base in $GF(2^8)$ is: $\beta$, $\beta^2$, $\beta^3$, $\beta^4$, $D\beta$, $D\beta^2$, $D\beta^3$, $D\beta^4$. Two elements b and c of $GF(2^8)$, represented as $b = a_0 + a_1.D$ and $c = a_2 + a_3.D$, with $a_i \in GF(2^4)$, can be multiplied as follows:

$b.c = (a_0 + a_1.D).(a_2 + a_3.D) = a_0 a_2 + (a_1 a_2 + a_0 a_3).D + a_1 a_3.D^2$.

Using the fact that D is a root of k(x), which implies that: $D^2 = D + \beta$, this gives the multiplication result:

$b.c = (a_0 a_2 + a_1 a_3 \beta) + (a_1 a_2 + a_0 a_3 + a_1 a_3).D$.

This has reduced the multiplication of two elements of $GF(2^8)$ to a series of multiplications and additions in $GF(2^4)$.

The inverse in GF($2^8$)

In principle any known method may be used to calculate the inverse of an element in GF($2^8$). Advantageously, if the previous method has been used to reduce the multiplication in GF($2^8$) to a multiplication in GF($2^4$), then the following method is used to reduce the inverse operation in GF($2^8$) to an inverse operation in GF($2^4$).

The inverse $b^{-1}$ of an element b in GF($2^8$), where b is represented as $b=a_0^2+a_1.D$, with $a_i \in GF(2^4)$, is given by:

$b^{-1}=(a_0^2+a_0a_1+a_1^2\beta)^{-1}.(a_0+a_1+a_1D)$, since:

$$b^{-1} \cdot b = (a_0^2 + a_0a_1 + a_1^2\beta)^{-1} \cdot (a_0 + a_1 + a_1D) \cdot (a_0 + a_1D)$$

$$= (a_0^2 + a_0a_1 + a_1^2\beta)^{-1} \cdot (a_0^2 + a_0a_1 + a_1^2D + a_1^2D^2),$$

and since $D^2+D=\beta$, this gives: $b^{-1}.b=1$.

In this way the inverse operation in GF($2^8$) is reduced to an inverse operation in GF($2^4$) and a series of multiplications and additions in GF($2^4$).

Multiplication in GF($2^4$)

In principle, any multiplication in GF($2^4$) may be used. Advantageously, as described before, the shifted polynomial base $\beta, \beta^2, \beta^3, \beta^4$ is taken as the base in GF($2^4$), where $\beta$ is the root of the irreducible polynomial $h(x)=x^4+x^3+x^2+x+1$ over GF(2), and $\beta^5=1$ in GF($2^4$). Since $\beta$ is a root of h, this implies:

$\beta^4+\beta^3+\beta^2+\beta=1$. Assuming that the base elements are named $e_1, e_2, e_3$ and $e_4$, with $e_i=\beta^i$, the base elements are multiplied in the following way, using the definition of $\beta$:

$e_1.e_1=\beta.\beta=\beta^2=e_2$
$e_1.e_2=\beta.\beta^2=\beta^3=e_3$
$e_1.e_3=\beta.\beta^3=\beta^4=e_4$
$e_2.e_4=\beta.\beta^5=1=e_1+e_2+e_3+e_4$
$e_2.e_2=\beta^2.\beta^2=\beta^4=e_4$
$e_2.e_3=\beta^2.\beta^3=\beta^5 1=e_1+e_2+e_3+e_4$
$e_2.e_4=\beta^2.\beta^4=\beta^6=\beta=e_1$
$e_3.e_3=\beta^3.\beta^3=\beta^6=\beta=e_1$
$e_3.e_4=\beta^3.\beta^4=\beta^7=\beta^2=e_2$
$e_4.e_4=\beta^4.\beta^4=\beta^8=\beta^3=e_3$ This in principle defines the multiplication in GF($2^4$). In binary terms the multiplication can be seen as follows. With respect to the base, each element b in GF($2^4$) can be represented as $b=b_0e_1+b_1e_2+b_2e_3+b_3e_4$, with $b_i \in GF(2)$. As such, the element b can be represented by a 4-dimensional vector with binary components ($b_0, b_1, b_2, b_3$). On a microprocessor this can be represented using a nibble. In binary terms, the multiplication of two elements b and c in GF($2^4$) can be seen as follows, assuming the two elements are represented by $b=(b_0, b_1, b_2, b_3)$ and $c=(c_0, c_1, c_2, c_3)$. Multiplying the two elements in the normal way gives:

$$b \cdot c = (b_0c_0)\beta^2 + (b_0c_1 + b_1c_0)\beta^3 + (b_0c_2 + b_1c_1 + b_2c_0)\beta^4 +$$

$$(b_0c_3 + b_1c_2 + b_2c_1 + b_3c_0)\beta^5 + (b_1c_3 + b_2c_2 + b_3c_1)\beta^6 +$$

$$(b_2c_3 + b_3c_2)\beta^7 + (b_3c_3)\beta^8$$

Using the definition of $\beta$ to replace $\beta^5$ by $\beta^4+\beta^3+\beta^2+\beta$, $\beta^6$ by $\beta$, $\beta^7$ by $\beta^2$, and $\beta^8$ by $\beta^3$, gives the following four components:

$b.c=(b_1c_3+b_2c_2+b_3c_1+b_0c_3+b_1c_2+b_2c_1+b_3c_0)\beta+(b_0c_0+b_2c_3+b_3c_2+b_0c_3+b_1c_2+b_2c_1+b_3c_0)\beta^2+(b_0c_1+b_1c_0+b_3c_3+b_0c_3+b_1c_2+b_2c_1+b_3c_0)\beta^3+(b_0c_2+b_1c_1+b_2c_0b_0c_3+b_1c_2+b_2c_1+b_3c_0)\beta^4$ The result of the multiplication, in binary terms, is, therefore, given by:

$$b \cdot c = (b_1c_3 + b_2c_2 + b_3c_1 + b_0c_3 + b_1c_2 + b_2c_1 + b_3c_0,$$

$$b_0c_0 + b_2c_3 + b_3c_2 + b_0c_3 + b_1c_2 + b_2c_1 + b_3c_0,$$

$$b_0c_1 + b_1c_0 + b_3c_3 + b_0c_3 + b_1c_2 + b_2c_1 + b_3c_0,$$

$$b_0c_2 + b_1c_1 + b_2c_0 + b_0c_3 + b_1c_2 + b_2c_1 + b_3c_0)$$

Inverse operation in GF($2^4$)

Using the normal base $\beta, \beta^2, \beta^4, \beta^8$, each element x of GF($2^4$) can be written as $b=a.\beta+b.\beta^2+c.\beta^4+d.\beta^8$, with a, b, c, d $\in$ GF(2). As such, each element can be represented by a 4-dimensional vector (a, b, c, d).

In order to obtain the inverse of b ($b^{-1}$):

calculate the following intermediate results: ab, a$\bar{b}$, $\bar{a}$b, bc, $\bar{b}$c, b$\bar{c}$, cd, $\bar{c}$d, c$\bar{d}$, da, $\bar{d}$a, d$\bar{a}$, where ab is the binary AND of a and b (a AND b) and $\bar{a}$ is the binary complement of a (NOT a). calculate the first bit of $b^{-1}$ by using cd $\bar{c}$d, c$\bar{d}$, $\bar{a}$b, b$\bar{c}$, and $\bar{d}$a as follows: (cd) OR ($\bar{a}$ AND c$\bar{d}$) OR ($\bar{c}$d AND $\bar{a}$b) OR (b$\bar{c}$ AND $\bar{d}$a) calculate the second bit of $b^{-1}$ by using da, $\bar{d}$a, d$\bar{a}$, $\bar{b}$c, c$\bar{d}$, $\bar{a}$b as follows: (da) OR ($\bar{b}$ AND d$\bar{a}$) OR ($\bar{d}$a AND $\bar{b}$c) OR (c$\bar{d}$ AND $\bar{a}$b) calculate the third bit of $b^{-1}$ by using ab $\bar{a}$b, a$\bar{b}$, $\bar{c}$d, d$\bar{a}$, $\bar{b}$c as follows: (ab) OR ($\bar{c}$ AND a$\bar{b}$) OR ($\bar{a}$b AND $\bar{c}$d) OR (d$\bar{a}$ AND $\bar{b}$c) calculate the fourth bit of $b^{-1}$ by using bc$\bar{b}$c, b$\bar{c}$, $\bar{d}$a, a$\bar{b}$, $\bar{c}$d as follows: (bc) OR ($\bar{d}$ AND b$\bar{c}$) OR ($\bar{b}$c AND $\bar{d}$a) OR (a$\bar{b}$ AND $\bar{c}$d)

Figure 8:
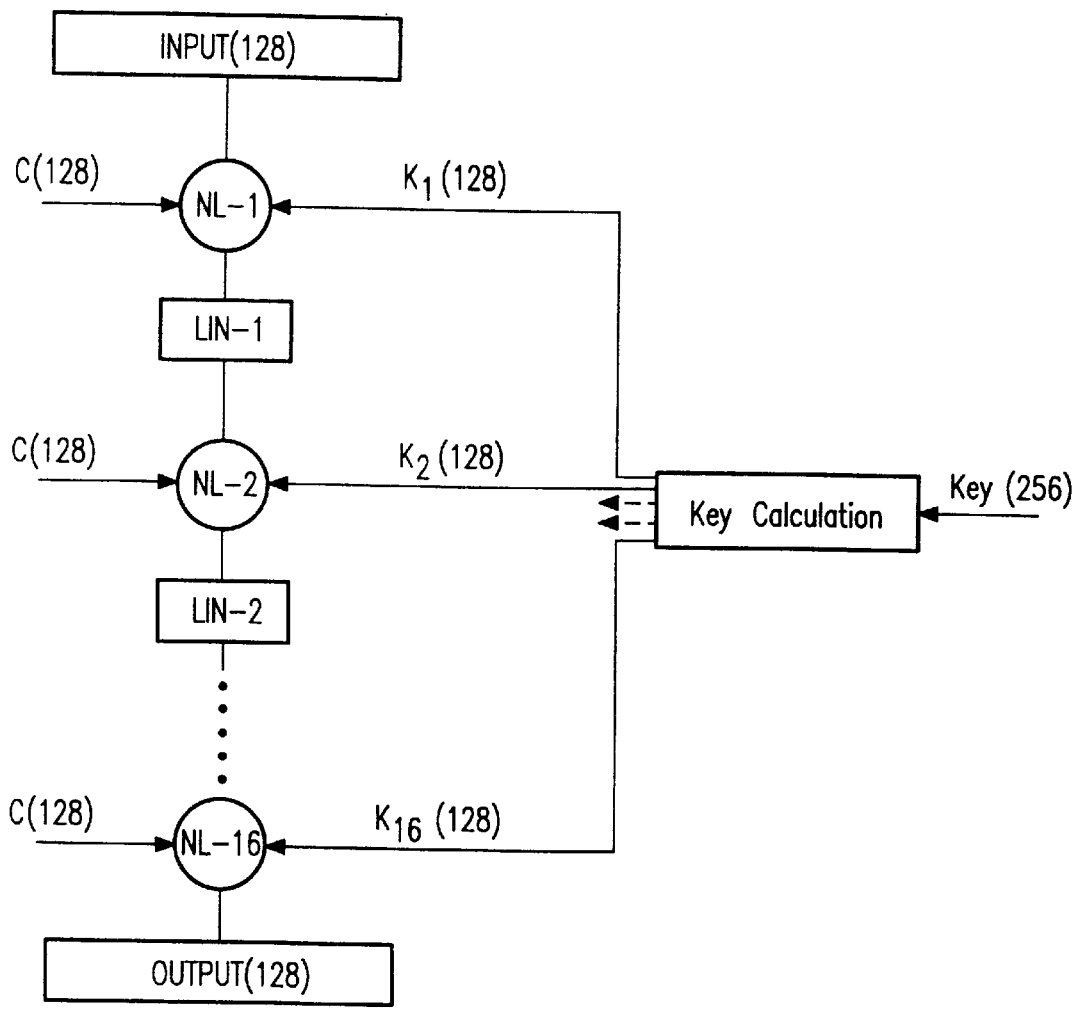
FIG. 8 shows an overall encryption system.

Besides being used in a DES-like system as shown in FIG. 1, a dedicated system can be built around the non-linear algorithm of the invention. Such a system is shown in FIG. 8. In this system, the blocks are processed using the non-linear operation NL of the invention and a linear operation LIN. The first step is the non-linear operation. This is followed by an iteration of the linear operation followed by the non-linear operation. It is expected that a sufficiently safe system is achieved by performing six non-linear operations (i.e. using five rounds), provided that the linear operation mixes the data bits thoroughly. Preferably, 15 rounds are used. Each of the linear operations is the same. Also, each of the non-linear operations is the same, but each non-linear operation uses a different key of 128 bits. Advantageously, keys are derived from one global key of, for instance, 256 bits, using a key schedule calculation. The same key is used for encryption as well as decryption. In most cases the key is provided using a smart-card. For the linear operation, advantageously, instead of a permutation a more complex matrix is used. As described before, in addition to the key, each non-linear operation may, optionally, use a constant C of 128 bits, which is split in the constants $p_j$ and $d_j$. The constant may be the same for each operation. Advantageously, each non-linear operations is provided with a separate constant. The constants may be predetermined per system (e.g. a customer-specific constant). Alternatively, the constant is generated using a pseudo-random generator.

What is claimed is:

1. A program stored on a computer readable medium for cryptographically converting a digital input data block M into a digital output data block; said program configured to perform the steps of merging a selected part M1 of said digital input data block M with a first digital key K1 to produce a data block B1 which non-linearly depends on said selected part M1 and said first key K1, and deriving said digital output block from said data block B1 and the remaining part of the input data block M; wherein said merging step is performed by executing a non-linear function g for non-linearly merging said selected part M1 and said first key K1 in a single step; wherein said merging step comprises the steps of splitting said selected part M1 in a first plurality n of sub-blocks $m_0, \ldots, m_{n-1}$ of substantially equal length; splitting said first key K1 in said first plurality n of sub-keys $k_0, \ldots, k_{n-1}$, substantially having equal length, the sub-key $k_i$ corresponding to the sub-block $m_i$, for i=0 to n−1; separately processing each of said sub-blocks $m_i$ by executing for each of said sub-blocks $m_1$ a same non-linear function h for non-linearly merging a sub-block $b_1$ derived from said sub-block $m_i$ with said corresponding sub-key $k_1$ in one, sequentially, inseparable step and producing said first plurality of output sub-blocks $h(b_i, k_i)$; and combining sub-blocks $t_i$ derived from said first plurality of said output sub-blocks $h(b_i, k_i)$ to form said data block B1; and wherein said function $h(b_i, k_i)$ is defined by:

| | |
|---|---|
| $h(b_i, k_i) = (b_i \cdot k_i)^{-1}$, | if $b_i \ne 0$, $k_i \ne 0$, and $b_i \ne k_i$ |
| $h(b_i, k_i) = (k_i)^{-2}$, | if $b_i = 0$ |
| $h(b_i, k_i) = (b_i)^{-2}$, | if $k_i = 0$ |
| $h(b_i, k_i) = 0$ | if $b_i = k_i$, | where the multiplication and inverse operations are predetermined Galois Field multiplication and inverse operations.

2. A program as claimed in claim 1, wherein deriving said sub-blocks $t_i$ from said output sub-blocks $h(b_i, k_i)$ comprises bit-wise adding a constant $d_i$ to said output sub-block $h(b_i, k_i)$, said constant $d_i$ substantially having equal length as said sub-block $m_i$.

3. A program as claimed in claim 2, wherein deriving said sub-blocks $t_i$ from said output sub-blocks $h(b_i, k_i)$ further comprises raising $h(b_i, k_i) \oplus d_i$ to a power $2^i$, using said predetermined Galois Field multiplication.

4. A program as claimed in claim 1, wherein said sub-block $m_i$ comprises eight data bits, and wherein said multiplying of two elements b and c of $GF(2^8)$ comprises executing a series of multiplications and additions in $GF(2^4)$.

5. A program as claimed in claim 4, wherein said multiplying of said two elements b and c comprises:

representing b as $a_0+a_1.D$ and c as $a_2+a_3.D$, where $a_0$, $a_1$, $a_2$ and $a_3$ are elements of $GF(2^4)$, and where D is an element of $GF(2^8)$ defined as a root of an irreducible polynomial $k(x)=x^2+x+\beta$ over $GF(2^4)$, where $\beta$ is an element of $GF(2^4)$; and calculating $(a_0a_2+a_1a_3\beta)+(a_1a_2+a_0a_3+a_1a_3).D$.

6. A program as claimed in claim 5, wherein $\beta$ is a root of an irreducible polynomial $h(x)=x^4+x^3+x^2+x+1$ over $GF(2)$.

7. A program as claimed in claim 1, wherein said sub-block $m_i$ comprises eight data bits, and wherein calculating the inverse of an element b of $GF(2^8)$ comprises performing a series of calculations in $GF(2^4)$.

8. A program as claimed in claim 7, wherein calculating the inverse of said element b comprises:

representing b as $a_0+a_1.D$, where $a_0$ and $a_1$ are elements of $GF(2^4)$, and where D is an element of $GF(2^8)$ defined as a root of an irreducible polynomial $k(x)=x^2+x+\beta$ over $GF(2^4)$, where $\beta$ is an element of $GF(2^4)$; and calculating $(a_0^2+a_0a_1+a_1^2\beta)^{-1}((a_0+a_1)+a_1D)$.

9. A processor for cryptographically converting a digital input data block M into a digital output data block; said processor comprising:

first input means for providing said digital input data block M;

second input means for providing a first digital key K1;

cryptographic processing means for converting the digital input data block M into the digital output data block; said conversion comprising merging a selected part M1 of said digital input data block M with said first key K1 and producing a data block B1 which non-linearly depends on said selected part M1 and said first key K1, said digital output data block being derived from said data block B1 and the remaining part of the digital input block M; and output means for outputting said digital output data block; characterized in that said cryptographic processing means is arranged to perform said merging by executing a non-linear function g for non-linearly merging said selected part M1 and said first key K1 in a single step wherein said merging step comprises the steps of splitting said selected part M1 in a first plurality n of sub-blocks $m_0, \ldots, m_{n-1}$ of substantially equal length; splitting said first key K1 in said first plurality n or sub-keys $k_0, \ldots, k_{n-1}$, substantially having equal length, the sub-key $k_i$ corresponding; to the sub-block $m_i$, for i=0 to n−1; separately processing each of said sub-blocks $m_i$ by executing for each of said sub-blocks $m_i$ a same non-linear function h for non-linearly merging a sub-block $b_i$ derived from said sub-block $m_i$ with said corresponding sub-key $k_i$ in one, sequentially inseparable step and producing said first plurality of output sub-blocks $h(b_i, k_i)$; and combining sub-blocks $t_i$ derived from said first plurality of said output sub-blocks $h(b_i, k_i)$ to form said data block B1 wherein said function $h(b_i, k_i)$ is defined by:

| | |
|---|---|
| $h(b_i, k_i) = (b_i \cdot k_i)^{-1}$, | if $b_i \ne 0$, $k_i \ne 0$, and $b_i \ne k_i$ |
| $h(b_i, k_i) = (k_i)^{-2}$, | if $b_i = 0$ |
| $h(b_i, k_i) = (b_i)^{-2}$, | if $k_i = 0$ |
| $h(b_i, k_i) = 0$ | if $b_i = k_i$, | where the multiplication and inverse operations are predetermined Galois Field multiplication and inverse operations.

10. A processor as claimed in claim 9, wherein said sub-block $m_i$ comprises eight data bits, and wherein said multiplying of two elements b and c of $GF(2^8)$ comprises:

representing b as $a_0+a_1.D$ and c as $a_2+a_3.D$, where $a_0$, $a_1$, $a_2$ and $a_3$ are elements of $GF(2^4)$, and where D is an element of $GF(2^8)$ defined as a root of an irreducible polynomial $k(x)=x^2+x+\beta$ over $GF(2^4)$, where $\beta$ is an element of $GF(2^4)$; and calculating $(a_0a_2+a_1a_3\beta)+(a_1a_2+a_0a_3+a_1a_3).D$;

and wherein calculating the inverse of an element b of $GF(2^8)$ comprises calculating $(a_0^2+a_0a_1+a_1^2\beta)^{-1}((a_0+a_1)+a_1D)$.

* * * * *